United States Patent [19]
Gochee

[11] Patent Number: 5,953,514
[45] Date of Patent: Sep. 14, 1999

[54] METHOD AND APPARATUS FOR TRANSPARENT REMOTE EXECUTION OF COMMANDS

[75] Inventor: James R. Gochee, Cupertino, Calif.

[73] Assignee: Apple Computer, Inc., Cupertino, Calif.

[21] Appl. No.: 08/553,769

[22] Filed: Oct. 23, 1995

[51] Int. Cl.[6] .................................................. G06F 15/163
[52] U.S. Cl. ...................... 395/500; 395/527; 395/680; 395/200.47; 707/205
[58] Field of Search ........................ 395/200.02, 200.05, 395/200.03, 200.09, 500, 604, 610, 617, 670, 200.46–200.47, 527, 680; 707/200–204

[56] References Cited

U.S. PATENT DOCUMENTS

| | | | |
|---|---|---|---|
| 4,747,040 | 5/1988 | Blanset et al. | 395/678 |
| 4,780,821 | 10/1988 | Crossley | 395/670 |
| 5,058,000 | 10/1991 | Cox et al. | 395/610 |
| 5,339,435 | 8/1994 | Lubkin et al. | 395/701 |
| 5,349,675 | 9/1994 | Fitzgerald et al. | 395/800 |
| 5,359,725 | 10/1994 | Garcia et al. | 395/616 |
| 5,375,207 | 12/1994 | Blakely et al. | 395/200.09 |
| 5,437,029 | 7/1995 | Sinha | 395/616 |
| 5,471,615 | 11/1995 | Amatsu et al. | 395/200.03 |
| 5,483,653 | 1/1996 | Furman | 395/500 |
| 5,535,375 | 7/1996 | Eshel et al. | 395/500 |
| 5,537,592 | 7/1996 | King et al. | 395/500 |
| 5,577,210 | 11/1996 | Abdous et al. | 395/200.1 |
| 5,613,090 | 3/1997 | Willems | 395/500 |
| 5,627,996 | 5/1997 | Bauer | 395/500 |
| 5,724,512 | 3/1998 | Winterbottom | 395/200.12 |
| 5,729,682 | 3/1998 | Marquis et al. | 395/200.12 |

*Primary Examiner*—Christopher B. Shin
*Attorney, Agent, or Firm*—Beyer & Weaver, LLP

[57] ABSTRACT

Improved method and apparatus for remote execution of commands are disclosed. A local computer issues a command to be executed on a remote computer. The improved method and apparatus operate to synchronize a working directory on the remote computer to a working directory on the local computer. The improved method and apparatus can also convert, modify or otherwise reformat remote commands so that they operate correctly on the remote computer and return results which are appropriate for the local computer. Thereafter, the remote computer executes the command.

12 Claims, 5 Drawing Sheets

METHOD AND APPARATUS FOR TRANSPARENT REMOTE EXECUTION OF COMMANDS

BACKGROUND OF THE INVENTION

1. Field of the Invention

The present invention relates to remote execution of commands, and more particularly, to remote execution of commands across different operating system platforms.

2. Description of the Related Art

Computers are commonly networked together so as to facilitate the transfer of data as well as to distribute work amongst the different computers. When the different computers include different operating systems, incompatibility problems can arise and cause programs on the computers to crash or otherwise not execute properly.

A major incompatibility problem between computers using different operating systems is that file names (paths) or directory structures utilized by the operating systems are not formatted or arranged the same way. Another incompatibility is that the commands themselves are not the same in different operating systems (e.g., UNIX vs. Microsoft Windows). Hence, when a command is issued at a local computer for remote execution on a remote computer, the command will likely not execute properly on the remote computer.

Beyond these incompatibility problems, remote execution of commands face other problems. Namely, remote execution of commands is a stateless operation in which the user of the local computer causes a remote command to execute on a remote computer, but does not cause the user to login to the remote computer (though the user would likely need to have an account on the remote machine at least in the UNIX environment).

The UNIX operating system includes a command "rsh" (for remote shell). The rsh command enables a local computer to request execution of commands on a remote computer. In particular, the rsh command requires (i) the name of the computer system you want to execute the command and (ii) the command you want to run on the remote computer. For example, if the command "rsh pumpkin lpq" is entered, then the lpq command runs on system pumpkin. Hence, in this example, the lpq command asks what is waiting for the printer on system pumpkin. So long as both the local and remote machines are utilizing the UNIX operating system, the rsh command in UNIX is useful to execute commands in a remote fashion.

When both the local and the remote machines are using the same (or compatible) operating systems, then remote execution will execute. However, because remote execution is stateless, the result produced by executing the command remotely may not be the result intended. Namely, if a user were to enter a command to list files, the resulting list would likely not be the list of files that the user desired because the remote machine would not have the same working directory as the local machine. When the computers are being used such that the local computer is using the disk storage on the remote computer, then it is important that operations performed with respect to the stored files yield the same results regardless of whether performed locally or remotely. However, due to the stateless nature of conventional remote execution, the results often differ between local and remote execution of commands.

Moreover, when the machines are not using the same operating system, besides the stateless problem, the differences in the operating systems cause additional problems in the remote execution of the commands. For example, if the local computer is using a Macintosh computer and the remote computer is a UNIX-based machine, remote commands are not likely to execute as intended. In particular, the commands are different, the path names and directory structures are different, and the result of commands may also differ.

Thus, there is need to provide solutions to the compatibility and stateless problems when remotely executing commands.

SUMMARY OF THE INVENTION

Broadly speaking, the invention pertains to techniques for improved execution of remote commands. Namely, the invention synchronizes a working directory on a remote machine to a working directory on a local machine. The invention also converts, modifies or otherwise reformats remote commands so that they operate correctly on the remote machine and return results which are appropriate for the local machine.

The invention can be implemented in numerous ways, including as a method, an apparatus, or a system, or on a computer readable medium.

A first implementation of the invention pertains to a method for executing commands on a remote computer system. The method includes the following operations: receiving, from a local computer system, both a command for remote execution and a working directory of the local computer system; synchronizing the working directory of the remote computer system to the working directory of the local computer system; and thereafter executing the command on the remote computer system. Additionally, the method may optionally also convert, prior to executing the command, any path names within the command parameters to a format suitable for the remote computer system.

A second implementation of the invention pertains to a method for remote execution of commands across operating system platforms. The method includes the following operations: requesting, at a local machine, remote execution of a command on a remote machine, where the local machine and the remote machine have different operating system platforms; sending the command and a working directory on the local machine to the remote machine; converting, at the remote machine, the working directory received from the local machine to a format suitable for use on the remote machine; setting a working directory on the remote machine to the converted working directory; and executing the command on the remote machine to produce a result. Additionally, the method may optionally convert, at the remote machine, any path names in the result to a format suitable for use on the local machine, thereby producing a converted result; and then send the converted result to the local machine. The method may also convert certain text within the result to a predetermined format. Preferably, the command being remotely executed is a remote shell command.

A third implementation of the invention pertains to a system for remote execution of commands. The system includes: a first computer having a first operating platform, the first operating platform including a plurality of commands at least one of which can be executed remotely, the first computer system includes at least a processor and primary memory, and the first computer executes a remote tool process at least partially stored in the primary memory of the first computer; a second computer having a second operating platform, the second operating platform being different from the first operating platform, the second computer includes at least a processor, primary memory and secondary disk storage memory, and the second computer executes a local agent process at least partially stored in the primary memory of the second computer; and a network link connecting the first and second computers. The execution of a remote command on the first computer causes the remote tool process to transmit a command to the second computer along with a working directory of the first operating platform on the first computer. Further, the second computer receives the remote command and the working directory from the remote tool process via the network link, the working directory received is then converted into a format suitable for the second operating platform, and thereafter the working directory on the second computer is set to be that identified by the converted working directory. Additionally, after setting the working directory on the second computer to the converted working directory, the second computer may also execute the remote command to produce a result. The result is then returned to the first computer. Preferably, the remote command is a remote shell command and the result is returned to the remote tool process on the first computer.

A fourth implementation of the invention pertains to a system for remote execution of commands. The system includes a local computer system having a first operating system utilizing a directory structure of a first format to organize files, a processor and memory, the local computer system further including at least means for requesting remote execution of a command, and means for sending the command and a working directory within the first operating system to another computer system for execution thereon; and a remote computer system having a second operating system utilizing a directory structure of a second format to organize files, a processor, memory, and a mass storage device, the remote computer system further including at least means for receiving the working directory from the local computer system, means for converting the working directory received from the local computer system from the first format to the second format, means for setting a working directory within the second operating system to the converted working directory, and means for executing the command on the remote computer system to produce a result. The remote computer may also include means for returning the result to the local computer system.

A fifth implementation of the invention pertains to a computer readable medium containing program instructions for facilitating remote execution of commands by a computer system. The computer readable medium includes computer readable code devices for receiving a remote execution command and a working directory with a first format from another computer system; computer readable code devices for converting the working directory received to a second format; computer readable code devices for setting a working directory of the computer system to the converted working directory; and computer readable code devices for executing the command on the computer system to produce a result.

The invention provides advantages over previous techniques for remote command execution. One advantage of the invention is that the remote commands are able to execute as intended even when the local and remote computers are using different operating systems. Another advantage of the invention is that the fact that the command is actually performed remotely is transparent to the user and other software tools. Such transparency enables software development to be done faster while utilizing remote computing resources.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to techniques for improved execution of remote commands. Namely, the invention synchronizes a working directory on a remote machine to a working directory on a local machine. The invention also converts, modifies or otherwise reformats remote commands so that they operate correctly on the remote machine and return results which are appropriate for the local machine.

Embodiments of the invention are discussed below with reference to FIGS. 1–4B. However, those skilled in the art will readily appreciate that the detailed description given herein with respect to these figures is for explanatory purposes as the invention extends beyond these limited embodiments.

Figure 1:
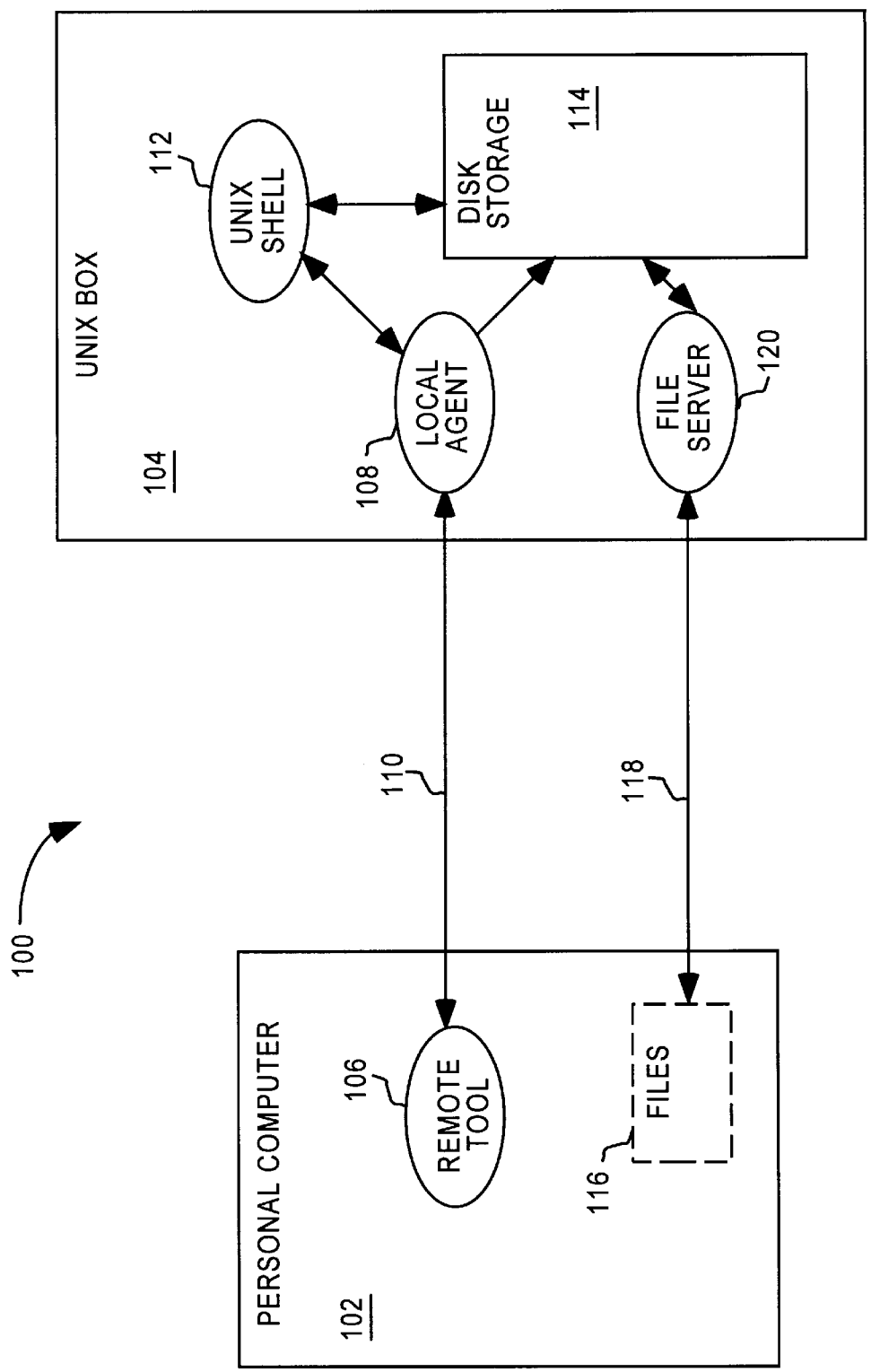
FIG. 1 is a block diagram of a networked computer system according to an embodiment of the invention.

FIG. 1 is a block diagram of a networked computer system 100 according to an embodiment of the invention. The networked computer system 100 includes a personal computer 102 and a UNIX box 104. The personal computer 102 is, for example, an IBM compatible computer or a Macintosh computer. The UNIX box 104 is a UNIX-based machine such as a RS6000 workstation computer from IBM or a PA-RISC workstation computer from Hewlett-Packard.

The personal computer 102 includes a remote tool 106. The remote tool 106 is a process running on the personal computer 102 and operates to receive commands for remote execution and forward them to the UNIX box 104 for execution thereon. As an example, when the personal computer 102 is a Macintosh computer, the remote tool 106 can be a Macintosh Programmers Workshop (MPW) Tool referred to as Remote. Remote is a command oriented application environment for executing remote commands. The processing performed by the remote tool 106 is discussed in detail below with reference to FIG. 3. The remote tool 106 is coupled to a local agent 108 of the UNIX box 104 through a network link 110. The network link 110 passes communication data between the remote tool 106 and the local agent 108 using, for example, TCP/IP. As an example, when the personal computer 102 is a Macintosh computer, the local agent 108 can be ToolD which is a UNIX tool that executes a command on behalf of someone else. The processing performed by the local agent 108 is discussed in detail below with reference to FIGS. 4A and 4B.

UNIX box 104 also includes a UNIX shell 112 which in conventional UNIX fashion executes the commands to be run on the UNIX box 104. The UNIX box 104 also includes disk storage 114 which is associated with semiconductor memory storage, disk drive storage, CD-ROM storage and/or the like.

The personal computer 102 also includes virtual files 116 which are coupled through a network link 118 to a file server 120. As an example, when the personal computer 102 is a Macintosh computer, the file server 120 can be a software program known as HELIOS available from Helios, Inc. HELIOS allows UNIX machines to broadcast themselves as AppleShare servers. In this case, HELIOS volume is mounted on the Macintosh computer. The file server 120 then in turn connects to the disk storage 114.

As illustrated in FIG. 1, the disk storage 114 is connected to the UNIX shell 112, the local agent 108 and the file server 120. The files 116 are denoted as virtual files because they do not actually reside on the personal computer 102 but instead reside on UNIX box 104 in the disk storage 114. However, even when remotely executing commands originally entered in the personal computer 102 for execution on the UNIX box 104, the user of the personal computer 102 is able to interact with the UNIX box 104 in a manner such that the user can conceptually act as if the files 116 were, in fact, stored within the personal computer 102.

Figure 2:
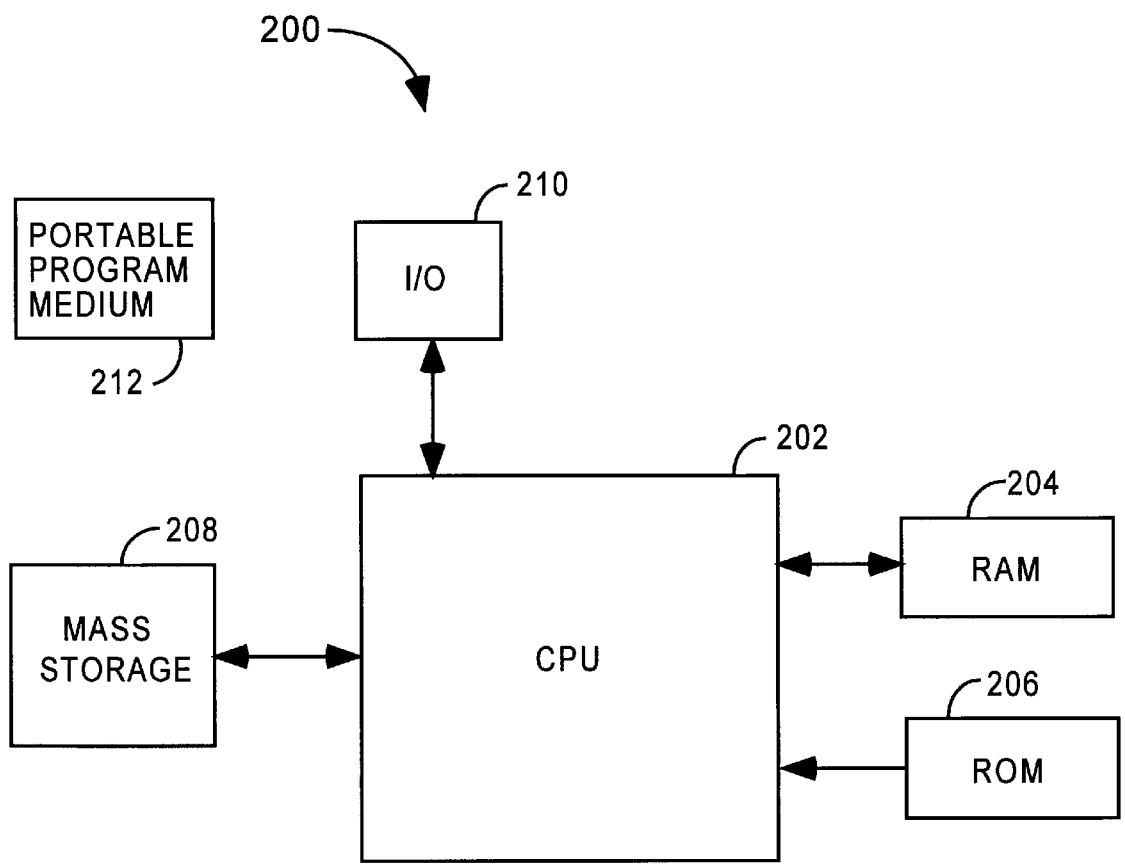
FIG. 2 is a schematic diagram of a representative computer system on which operations associated with the invention can be performed.

FIG. 2 is a schematic diagram of a representative computer system 200 on which directory synchronization or formatting of remote commands according to the invention can be performed. The computer system 200 includes a central processing unit (CPU) 202 which is coupled bidirectionally with random access memory (RAM) 204 and unidirectionally with read only memory (ROM) 206. The mass storage device 208, such as a hard disk, CD-ROM drive, magneto-optical drive, tape drive or the like, is coupled bidirectionally with CPU 202. The mass storage device 208 generally includes additional programming instructions and data that typically are not in active use by the CPU 202. The computer system 200 further includes an input/output source 210 that typically includes input media such as a keyboard, pointer devices (e.g., a mouse or stylus) and/or network connections. Additional mass storage devices (not shown) may also be connected to CPU 202 through a network connection. The CPU 202 together with an operating system (not shown) operate to execute computer code. The computer code may reside on the RAM 204, the ROM 206, or a mass storage device 208. The computer code could also reside on a portable (or removable) storage medium 212 and then loaded or installed onto the computer 200 when needed. Portable storage mediums 212 are computer readable and include, for example, CD-ROMS, PCM-CIA devices, RAM devices, floppy disk, magnetic tape, and the like. It will be appreciated by those skilled in the art that the above described hardware and software elements, as well as networking devices, are of standard design and construction and are familiar to those skilled in the art.

The computer system 200 is general enough to describe the basic functional elements of either the personal computer 102 or the UNIX box 104. When operating as the personal computer 102, the CPU 202 among other conventional tasks operates to execute a process associated with the remote tool 106. However, when operating as the UNIX box 104, the CPU 202 among other conventional tasks operates to execute processes associated with the UNIX shell 112, the local agent 108 and the file server 120, and the mass storage 208 could provide the disk storage 114.

Figure 3:
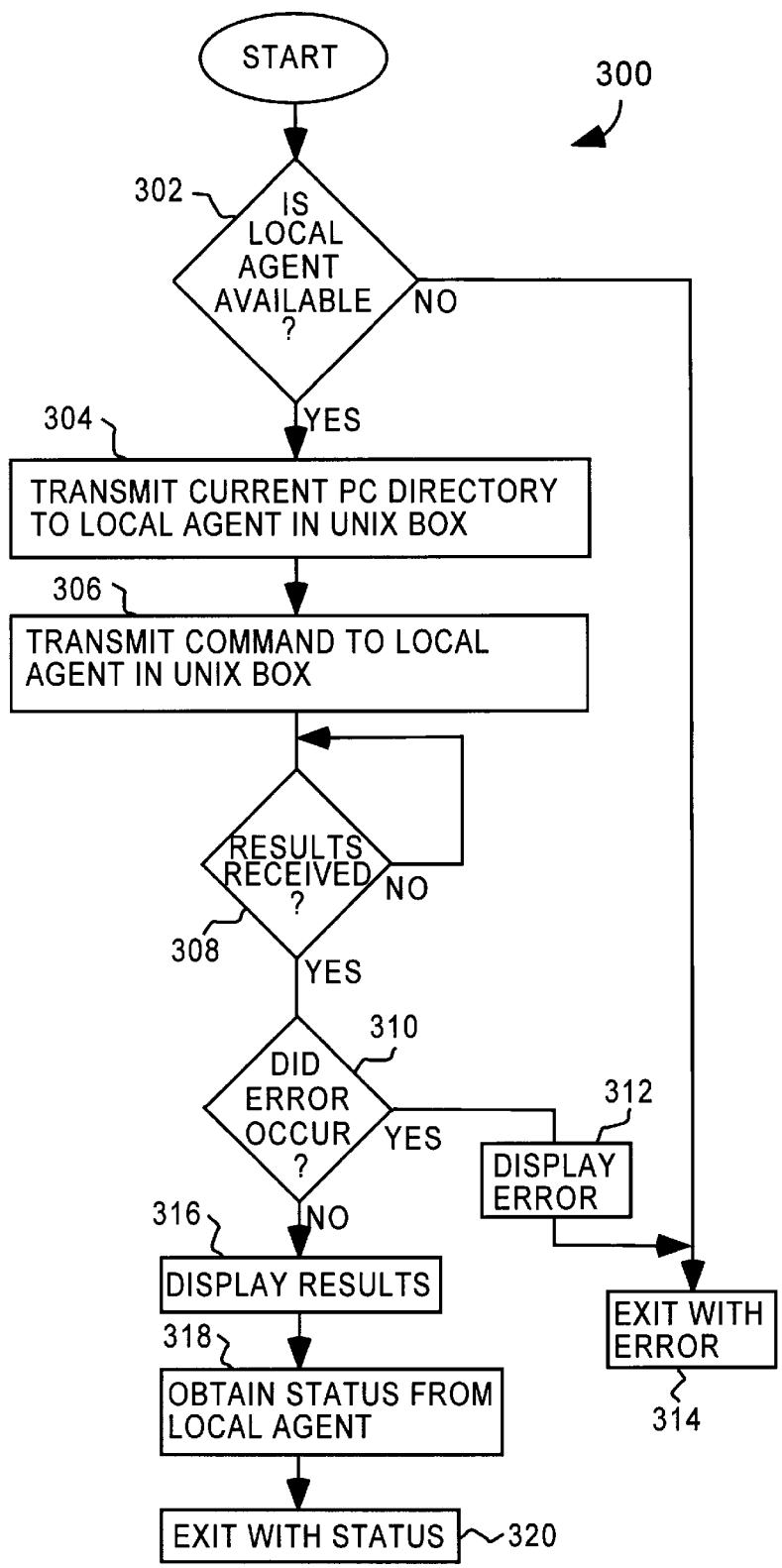
FIG. 3 is a flow chart of remote tool processing associated with an embodiment of the invention.

FIG. 3 is a flow chart of processing performed by the remote tool 106. Recall, the remote tool 106 is a process executing on the personal computer 102.

The remote tool processing 300 begins with a decision 302 based on whether the local agent 108 is available. If the local agent 108 is not available to the remote tool 106, then the decision block 302 of the remote tool processing 300 exits 314 with an error indication to the user. The local agent 108 functions to accept commands from the remote tool 106. The local agent 108, for example, sets up a UNIX "socket" so as to communicate with the remote tool 108. A socket is a connection point that TCP/IP allows other computers on a network to connect with. The local agent 108 would be unavailable if, for example, the UNIX box 104 was rebooted and the local agent 108 had not been activated. On the other hand, if the local agent 108 is available to the remote tool 106, the current PC directory is transmitted 304 by the remote tool 106 to the local agent 108 in the UNIX box 104. The current PC directory is the current working directory for the personal computer 102. The current PC directory is determined and managed by the operating system, such as Windows or DOS, executing on the personal computer 102.

Next, a command is transmitted 306 to the local agent 108 in the UNIX box 104. Here, a command entered by the user of the personal computer 102 for remote execution is transmitted 306 by the remote tool 106 through the network link 110 to the local agent 108. The local agent 108 then performs various processing operations (FIG. 4) and eventually executes the command on the UNIX box 104. Hence, with respect to the personal computer 102, the command is remotely executed.

Thereafter, the remote tool processing 300 performs a decision 308 based on whether results from the execution of the command by the UNIX box 104 have been received. If not, the remote tool processing 300 waits until the results are received. Once the results are received, decision 310 is performed based on whether an error occurred during the execution of the command by the UNIX box 104 (remote computer). If an error did occur, the error is displayed 312 and the remote tool processing 300 exits 314 with an error indication. On the other hand, if no error occurred during execution of the command by the UNIX box 104, then the results of the command are displayed 316. Here, the displaying is preferably done on a display screen (not shown), associated with the personal computer 102. Next, the status is obtained 318 from the local agent 108. Here, the status indicates, for example, whether or not the command executed remotely using a returned integer value. Thereafter, the remote tool processing 300 exits 320 with the status indicated.

Figure 4A:
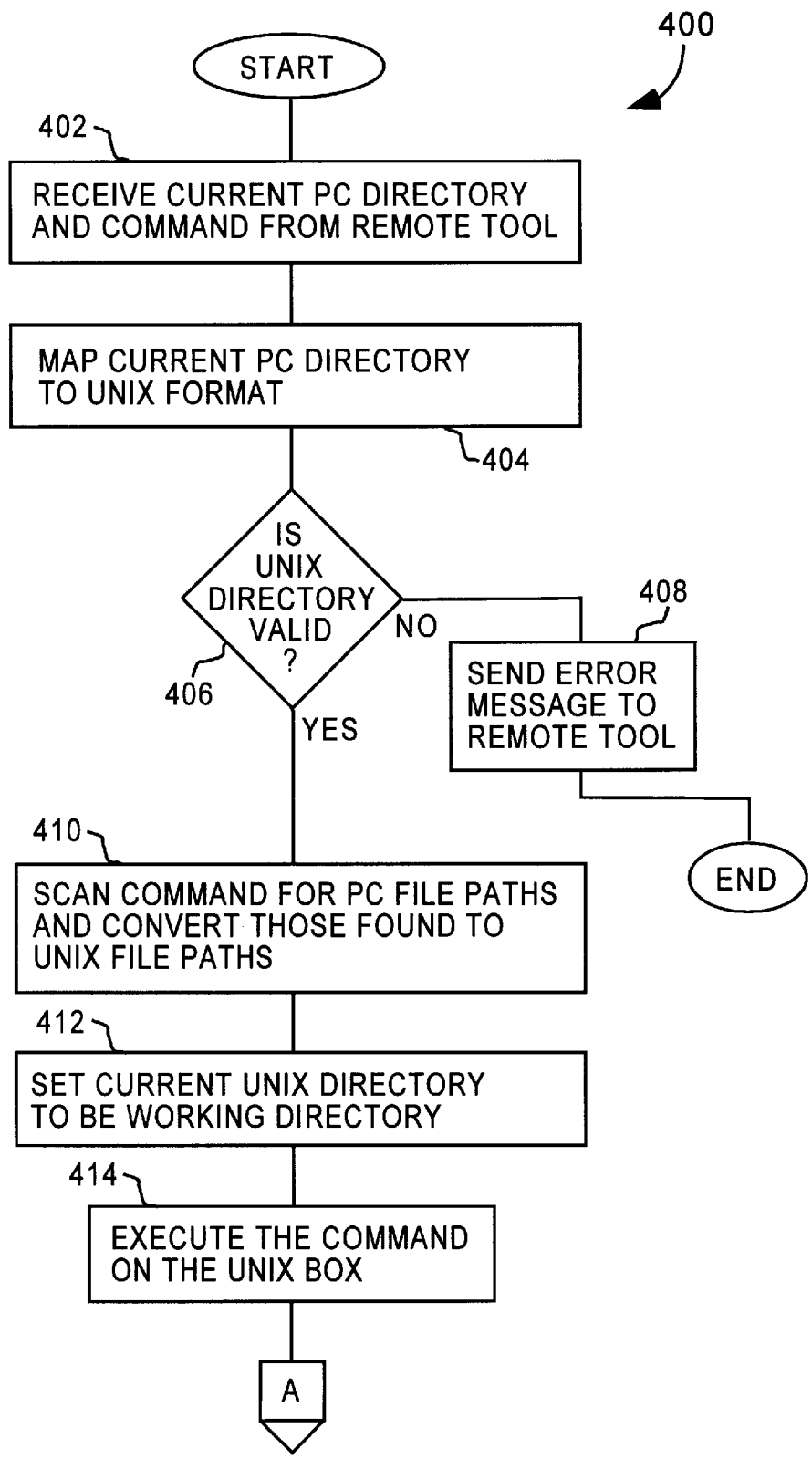
FIGS. 4A and 4B are flow charts of local agent processing associated with an embodiment of the invention.
Figure 4B:
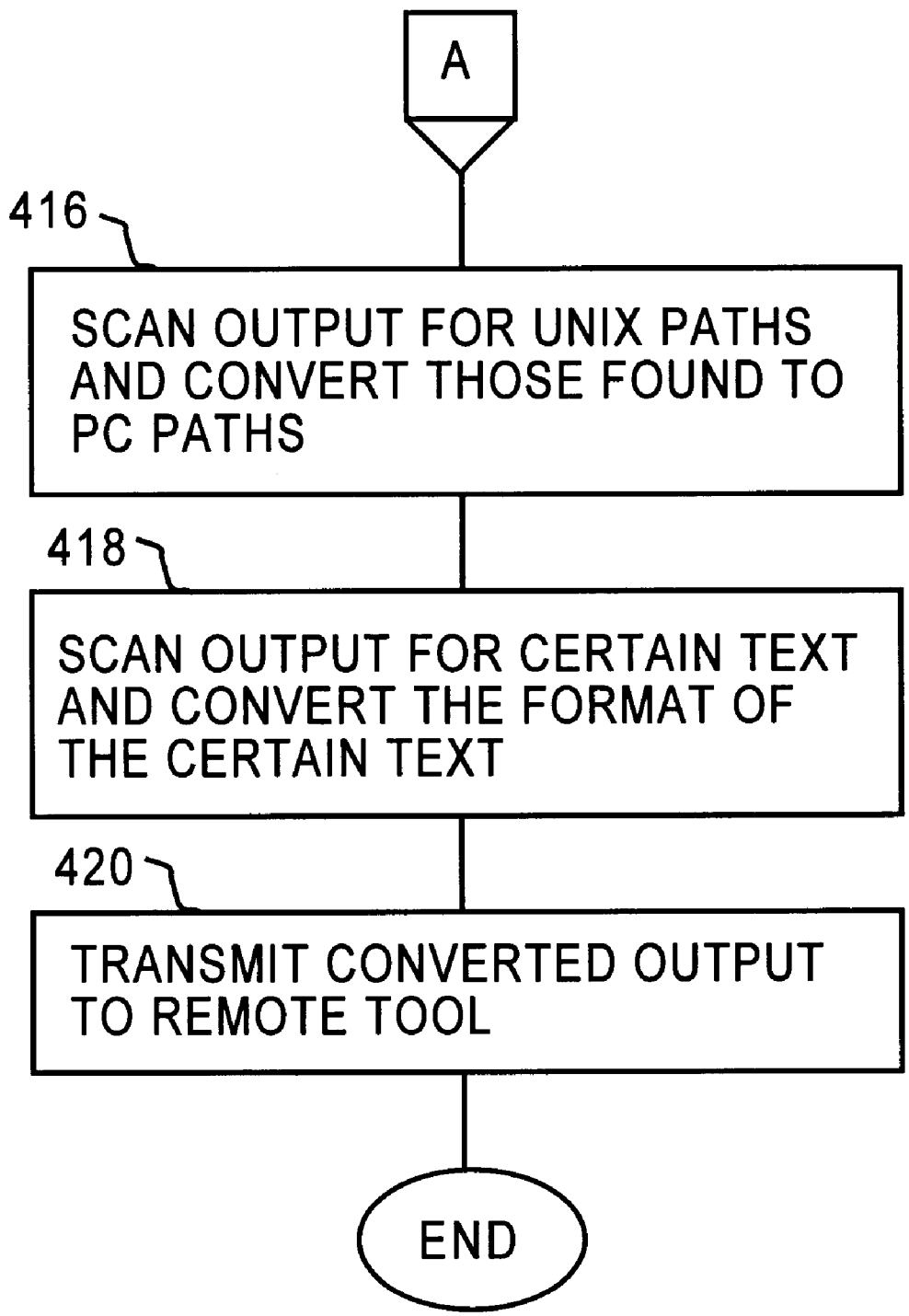

FIGS. 4A and 4B are flow charts of local agent processing 400 associated with an embodiment of the invention. The local agent processing 400 is performed by the local agent 108 of the UNIX box 104.

The local agent processing 400 receives 402 the current PC directory from the remote tool 106. In particular, the local agent 108 is receiving 402 both the current PC directory and the command transmitted 304, 306 by the remote tool processing 300. The current PC directory is then mapped 404 to a UNIX format. In the exemplary embodiment, the current PC directory is of a Macintosh format which is distinct from a UNIX format. Hence, in block 404 the current PC directory from the personal computer 102 is mapped or otherwise converted to a directory for the UNIX format. The mapping 404 of the current PC directory to the UNIX format can be done by program code which implements the known conversion rules. Alternatively, in the exemplary embodiment with HELIOS operating as the file server 120, the local agent 108 can make use of the existing mapping table of the Macintosh directory (volume) names to UNIX directory (path) names for the UNIX file system that are maintained by HELIOS. An example of the HELIOS mapping table is as follows.

| UNIX Directory | Macintosh Directory | Permission |
|---|---|---|
| /usr/home/jones/helios/source | source | rw |

Hence, if the current PC directory was "source", the mapping 404 would replace "source" with "/usr/home/jones/helios/source".

Typically, the command portion (apart from the directory or other path information contained within the command) is a command recognized by the operating systems of both the personal computer 102 and the UNIX box 104. In this case, the command portion need not be converted or mapped. For example, in Macintosh computers, there are many commands originally associated with UNIX which are mimicked in the remote tool 106 or the Macintosh computer system. On the other hand, if the command portion is not a command recognized by the UNIX box 104, then the command portion could also be mapped into a UNIX format (e.g., "dir" in DOS could be mapped to "ls" in UNIX).

Next, a decision 406 is made based on whether the current UNIX directory is valid. Here, the local agent processing 400 determines whether the current UNIX directory (obtained by mapping 404 the current PC directory) is a valid directory within the UNIX box 104. If not, then the local agent processing 400 sends an error message to the remote tool 106 and then exits the local agent processing 400. On the other hand, if the current UNIX directory is valid, then the command is scanned 410 for PC directions or paths, and those which are found are converted to UNIX directories or paths. Here, if the contains directory or other path information command (apart from the command itself), these directories or paths must also be converted to the UNIX file system format. Next, the current UNIX directory is set 412 to be the working directory on the UNIX box 104.

The command is then executed 414 on the UNIX box 104. The execution 414 of the UNIX command is carried out by the UNIX shell 112 in a conventional fashion. The execution 414 of the command produces an output.

The output is then scanned 416 for UNIX directories or paths, and those which are found are converted to PC directories or paths. Here, directories or paths for the UNIX system are converted to the corresponding directories or paths in the PC system so that the output is suitable for the personal computer 102, even though it was produced by the UNIX box 104. The output is then scanned 418 for certain text and, if found, the format of the certain text is converted, thereby producing a converted output. Namely, when the execution of remote commands result in error messages or other descriptive text, in some cases the text would preferably be returned or displayed with the same format as that which would be produced if the command had executed locally on the personal computer 102. This is particularly important when the output is used by the personal computer 102 by other applications or processes which interact with the remote tool 106 and expect and often require a predetermined format. After such conversion, the converted output is transmitted 420 to the remote tool 106 of the personal computer 102. Following block 420, the local agent processing 400 is completed.

Several illustrative examples of the invention are provided below. In these examples, the local computer 102 is a Macintosh computer operating Remote within the MPW environment as modified by the invention as the remote tool 106 thereby facilitating execution of remote commands, and the remote computer 104 is a UNIX box operating UNIX as the remote operating system platform with the local agent 108 being ToolD as modified by the invention.

EXAMPLE 1

First, the working directory is set on the local computer 102 by the following command.

directory erict:

Next, the following command is entered on the local computer 102 to list the files.

files:

The result is a list of files in the working directory and the list is for example as follows.

:fileA:

:fileB:

:fileC:

These files are within the virtual files 116 of the local computer 102, but reside on the disk storage 114 of the remote computer 104. On the other hand, if the following remote command is entered on the local computer 102 to list the files, remote ls -F then, the list of files is, for example, as follows.

fileD/ fileE/

These are the files of the home directory of the user on the remote computer 104 because there is no state associated with the command being remotely executed.

Nevertheless, by using the invention, the correct list will be returned to the user because the current PC directory is sent to the remote computer 104 which allows synchronization of the local and remote working directories. Consequently, with the invention, the result is the following list of files which is essentially the same as if the command was executed locally on the local computer 102.

fileA/ fileB/ fileC/

Thus, in order to get the above list using the remote command, the working directory "erict" for the local computer 102 must be sent to the remote computer 104, the local and remote working directories must be synchronized, and the remote command must be slightly reformatted for this specific implementation to the following.

sh -c "ls -F" 2>&1</dev/null

The "sh -c" portion directs the command to the UNIX shell 112, the "ls -F" portion is the command, and the remaining portion "2>&1</dev/null" directs the result to the local agent 108 (e.g., ToolD). Note that in this example the format of the result is slightly different than the corresponding local result. Hence, the list produced by the remote command are preferably converted to the format of the local computer (e.g., "fileA/" would be converted to ":fileA:").

EXAMPLE 2

This example concerns remotely compiling a file on the remote computer 104 according to the invention. Assume that the working directory on the local computer 102 has been set to "erict" and the "erict" directory includes a file "Test.c". Now the following remote command is entered.

remote xlc Test.c

The "xlc" portion of the remote command is a compile command to be executed remotely, and the file "Test.c" is the file to be compiled. According to the invention, the working directory "erict" for the local computer 102 is sent to the remote computer 104, and the remote command is reformatted for this specific implementation to the following.

sh -c "xlc Test.c" 2>&1</dev/null

The "sh -c" portion directs the command to the UNIX shell 112, the "xlc" portion is the command, "Test.c" is the file to be compiled, and the remaining portion "2>&1</dev/null" directs the result to the local agent 108 (e.g., ToolD). By sending the working directory to the remote computer 104, the remote computer 104 is able to find the Test.c file. Then, the remote computer 104 can execute the reformatted command via the UNIX shell 112 and direct the result to the local agent 108.

Assume that Test.c does not compile correctly because of a syntax error on line 10. The result in this case would be an error message indicating the location of the error. From the remote execution the error message in this specific implementation could, for example, have been as follows.

"Test.c", line 10.1: 1506-046 (S) Syntax error.

However, the local compiler or other tool operating on the local computer 102 in conjunction with the local compiler, typically has an error message format which differs from the error format of the remote compiler. As a result, the local compiler or tools operating therewith are not able to handle the error message as they would if the file had been compiled locally. Hence, the invention also operates to reformat the error message to the format that the local compiler uses. The reformatted error message could, for example, be as follows:

File ":Test.c"; Line 10.; # (line 10.1): 1506-046 (S) Syntax error.

Although the processing according to the invention discussed above describes the mapping and conversion operations as being performed on the remote computer, it should be recognized that these operations could also be performed at the local computer, or by both the local and remote computers. Preferably, most of the above described processing is performed on the remote computer because it typically has the greater resources such as computing power and access to mapping tables (e.g., helios).

Although the above described embodiments refer to the UNIX system as being the remote platform, other platforms could be substituted such as Windows, WindowsNT or OS/2 therefor. Likewise, although the local platform is described using a Macintosh platform, other platforms could also be used.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for remote execution of commands across operating system platforms, said method comprising:

(a) requesting, at a local machine, remote execution of a command on a remote machine, the local machine and the remote machine having different operating system platforms;

(b) sending the command and a working directory on the local machine to the remote machine;

(c) converting, at the remote machine, the working directory received from the local machine to a format suitable for use on the remote machine;

(d) setting a working directory on the remote machine to the converted working directory;

(e) executing the command on the remote machine to produce a result;

(f) scanning the result for the presence of path names of the format suitable for use on the remote machine and converting said path names to the format of the local machine;

(g) reformatting certain text within the converted result; and (h) sending the converted result to the local machine.

2. A method as recited in claim 1, wherein said reformatting (g) converts the certain text within the result to a predetermined format.

3. A method as recited in claim 2, wherein said executing (e) comprises:

(e1) converting the command received from the local machine to a format suitable for use on the remote machine; and (e2) executing the converted command on the remote machine.

4. A method as recited in claim 1, wherein said executing (e) comprises:

(e1) converting the command received from the local machine to a format suitable for use on the remote machine; and (e2) executing the converted command on the remote machine.

5. A method for remote execution of commands, said method comprising:

(a) requesting, at a local machine, remote execution of a command on a remote machine, the local machine and the remote machine having different operating system platforms;

(b) sending the command and a current working directory on the local machine to the remote machine;

(c) converting the current working directory on the local machine to a format suitable for use on the remote machine;

(d) scanning the command for the presence of path names of the format of the local machine and converting said path names to the format of the remote machine;

(e) setting the current working directory on the remote machine to the converted working directory;

(f) executing the converted command on the remote machine to produce a result;

(g) scanning the result for the presence of path names of the format of the remote machine and converting said path names to the format of the local machine;

(h) reformatting certain text within the converted result; and (i) sending the converted result to the local machine.

6. A system for remote execution of commands, comprising:

a first computer having a first operating platform, the first operating platform including a plurality of commands at least one of which can be executed remotely, said first computer system includes at least a processor and primary memory, and said first computer executes a remote tool process at least partially stored in the primary memory of said first computer;

a second computer having a second operating platform, the second operating platform being different from the first operating platform, said second computer includes at least a processor, primary memory and secondary disk storage memory, and said second computer executes a local agent process at least partially stored in the primary memory of said second computer; and a network link connecting said first and second computers, wherein execution of a remote command on said first computer causes the remote tool process to transmit a command to the local agent of said second computer along with a working directory of the first operating platform on said first computer, and wherein the local agent of said second computer receives the remote command and the working directory from the remote tool process via said network link, the working directory received is then converted into a format suitable for the second operating platform, thereafter the working directory on said second computer is set to be that identified by the converted working directory, execute the remote command to produce a result after setting the working directory on said second computer to the converted working directory, scan the result for the convert said path names to a format suitable for the first operating platform, reformat certain text within the converted result, and then returns the converted result to said first computer.

7. A system as recited in claim 6, wherein said second computer further comprises a file server allowing said first computer to use files on the secondary disk storage memory of said second computer.

8. A system for remote execution of commands, said system comprising:

a local computer system having a first operating system utilizing a directory structure of a first format to organize files, a processor and memory, said local computer system further including at least means for requesting remote execution of a command, and means for sending the command and a working directory within the first operating system to another computer system for execution thereon; and a remote computer system having a second operating system utilizing a directory structure of a second format to organize files, a processor, memory, and a mass storage device, said remote computer system further including at least means for receiving the working directory from said local computer system, means for converting the working directory received from said local computer system from the first format to the second format, means for setting a working directory within the second operating system to the converted working directory, means for executing the command on said remote computer system to produce a result;

means for scanning the result for the presence of path names of the second format and converting said path names to the first format;

means for reformatting certain text within the converted result; and means for returning the converted result to said local computer system.

9. A system as recited in claim 8, wherein the second operating system is different from the first operating system and the second format is different from the first format.

10. A computer readable medium containing program instructions for facilitating remote execution of commands by a computer system, said computer readable medium comprising:

computer readable code devices for receiving a remote execution command and a working directory with a first format from another computer system;

computer readable code devices for converting the working directory received to a second format;

computer readable code devices for setting a working directory of the computer system to the converted working directory;

computer readable code devices for executing the command on the computer system to produce a result;

computer readable code devices for scanning the result for the presence of path names in the second format and converting said path names to the first format for the other computer system;

computer readable code devices for reformatting certain text within the converted result; and computer readable code devices for sending the converted result to the the other computer system.

11. A computer readable medium as recited in claim 10, wherein said computer readable medium for reformatting the certain text within the converted result operates to convert the certain text to a predetermined format.

12. A computer readable medium as recited in claim 11, wherein said computer readable medium further comprising:

computer readable code devices for converting the remote execution command to the second format for the computer system.

* * * * *